(12) United States Patent
Abbo et al.

(10) Patent No.: US 7,596,679 B2
(45) Date of Patent: Sep. 29, 2009

(54) INTERCONNECTIONS IN SIMD PROCESSOR ARCHITECTURES

(75) Inventors: Anteneh A. Abbo, Eindhoven (NL); Leo Sevat, Veldhoven (NL); Richard P. Kleihorst, Neerpelt (NL)

(73) Assignee: NXP B.V., Eindhoven (NL)

( * ) Notice: Subject to any disclaimer, the term of this patent is extended or adjusted under 35 U.S.C. 154(b) by 290 days.

(21) Appl. No.: 11/575,068

(22) PCT Filed: Sep. 8, 2005

(86) PCT No.: PCT/IB2005/052929

§ 371 (c)(1),
(2), (4) Date: Mar. 9, 2007

(87) PCT Pub. No.: WO2006/027751

PCT Pub. Date: Mar. 16, 2006

(65) Prior Publication Data

US 2008/0320273 A1 Dec. 25, 2008

(30) Foreign Application Priority Data

Sep. 9, 2004 (EP) .................................. 0420004

(51) Int. Cl.
*G06F 12/00* (2006.01)
(52) U.S. Cl. ....................................................... 712/22

(58) Field of Classification Search .................... 712/22
See application file for complete search history.

(56) References Cited

U.S. PATENT DOCUMENTS

| | | | | |
|---|---|---|---|---|
| 4,827,403 | A * | 5/1989 | Steele et al. | 712/13 |
| 5,638,533 | A * | 6/1997 | Law | 711/157 |
| 5,960,211 | A * | 9/1999 | Schwartz et al. | 712/22 |
| 6,018,814 | A * | 1/2000 | Rockoff | 714/724 |
| 2003/0126351 | A1* | 7/2003 | Park | 711/5 |
| 2004/0133750 | A1 | 7/2004 | Stewart et al. | |

OTHER PUBLICATIONS

Morton S G: "Intelligent Memory Chips Give Fully Programmable Synaptic Weights" Proceedings of the SPIE, Bellingham VA, US; vol. 1100, Mar. 28, 1989; pp. 136-150.

* cited by examiner

*Primary Examiner*—Eric Coleman

(57) ABSTRACT

A single instruction multiple data (SIMD) processor (1) comprises a processing element array (10) including a plurality of processing elements (PE0 ... PEN), and a memory array (14) operably divided into memory portions ($14_1$ ... $14_N$), each memory portion being assigned to a particular processing element. A first processing element ($PE_N$) is operable to access a portion of the memory array (14) assigned to that first processing element and also to access a portion of the memory array assigned to a second processing element. Such access is made using an index value indicative of the processing element assigned to the memory position to be accessed.

12 Claims, 7 Drawing Sheets

| | PE Task | Effect @PE 10 | Effect @PE 14 | PE Mux Select |
|---|---|---|---|---|
| (a) | accu = Red(0); | accu = R10; | accu = R14; | own |
| | accu = Red(1); | accu = R11; | accu = R15; | own |
| | accu = Red(2); | accu = R12; | accu = R16; | right |
| | accu = Red(3); | accu = R13; | accu = R17; | right |
| | accu = Red(-2); | accu = R8; | accu = R12; | left |
| | accu = Red(-1); | accu = R9; | accu = R13; | left |
| (b) | accu = Red(0); | accu = R10; | accu = R16; | own |
| | : | : | : | : |
| | accu = Red(3); | accu = R13; | accu = R17; | own |
| | accu = Red(4); | accu = R14; | accu = R16; | right |
| | : | : | : | : |
| | accu = Red(7); | accu = R17; | accu = R17; | right |
| | accu = Red(-4); | accu = R6; | accu = R10; | left |
| | : | : | : | : |
| | accu = Red(-1); | accu = R9; | accu = R13; | left |

FIG. 5

INTERCONNECTIONS IN SIMD PROCESSOR ARCHITECTURES

The present invention relates to interconnections in SIMD (single instruction multiple data) processor architectures.

BACKGROUND OF THE INVENTION

The growing complexity of multi-media applications is continuously leading to the need for greater computational performance. In this regard, general purpose CPUs and DSPs (central processing units and digital signal processors) have been developed that use parallel processing by using media-accelerators which exploit data and task-level parallelism.

However, such media-accelerators are just enhancements in an effort to cope with the limitations of traditional CPU architectures in achieving high-performance. Consequently, the solutions result in high-power dissipation per unit of operation. A potentially more successful approach exploits the full data-parallelism available to come up with a power efficient architecture. One such architecture is Xetal (for example, see "Smart Cameras: Architectural Challenges", Proceedings of ACIVS 2002, Ghent, Belgium) which is based on the single-instruction multiple-data (SIMD) processing paradigm. This paradigm preserves the locality of data due to the massive parallelism and allows sharing of resources such as instruction and address decoders, both of which are important for reducing power consumption.

FIG. 1 is a block diagram illustrating a SIMD architecture. The architecture 1 includes a processing element array 10, which comprises a plurality of processing elements PE-0 ... PE-N. The processing elements PE-0 to PE-N receive data from an input line memory 12, which itself receives data 3 via an input pre-processing unit 40. The SIMD architecture 1 also includes a working memory array 14, which is operably divided into memory portions. Each memory portion is associated with a particular one of the processing elements in the processing element array 10. The processing elements in the array 10 are able to transfer data to and from the working memory array 14, in order to process that data in accordance with instructions received by the processing elements. An output line memory unit 16 is provided for outputting data, via an output post-processing unit 50.

The array 10 is controlled by a global control processor 20 which operates in accordance with the program stored in program memory 30. The control processor 20 operates to supply instructions to the processing element array in accordance with the retrieved program.

The input line memory unit 12 provides serial-to-parallel conversion of incoming data, whilst the output line memory unit 14 provides parallel-to-serial conversion of outgoing data. In video processing applications, the output path can be provided with a serial processor (50) to extract statistical information from a predefined region of interest in a video frame. This information can be used for adaptive video-processing such as auto-white balance and exposure-time control.

An important issue in SIMD architectures (and similar parallel processing machines) is the degree of inter-communication between the processing elements. The more the number of the communication channels, the more efficient the execution of certain signal processing algorithms. Algorithms like filtering involve basic convolution operations over a, range of neighbouring data elements and benefit from a processor-to-processor communication channel.

Assuming an interconnection level of N data elements per PE, (for most image processing kernels $N \geq 3$), then to have access to all N data elements with minimal latency, the PE requires N communication channels. An N-to-1 switch (multiplexor) would then be needed to connect one of the N channels to the PE input. FIG. 2 shows logical communication paths of a PE accessing data from six neighbouring data points. It will be readily appreciated that this leads to a very complex network of interconnections between PEs and memory.

Indeed, the greater the degree of communication and the higher the number of processing elements in the design, the more complex the physical design becomes in terms of design time to find an optimal interconnect topology with respect to silicon area and performance. Reducing the complexity of the interconnection network is an important issue in SIMD architectures. Failure to address the issue successfully, usually prevents massively parallel systems being effective.

Accordingly, there is a need for a methodology that enables PE to PE communication and PE to memory communication that is cost effective and practicable.

SUMMARY OF THE PRESENT INVENTION

According to one aspect of the present invention, there is provided a single instruction multiple data (SIMD) processor comprising: a processing element array including a plurality of processing elements; a memory array operably divided into memory portions, each memory portion being assigned to a particular processing element, characterised in that a first processing element is operable to access a portion of the memory array assigned to that first processing element and to access a portion of the memory array assigned to a second processing element, such access being made using an index value indicative of the processing element assigned to the memory portion to be accessed.

BRIEF DESCRIPTION OF THE DRAWINGS

FIG. 5 illustrates PE accumulator and control values for an interleaving technique embodying the present invention.

DETAILED DESCRIPTION OF THE PREFERRED EMBODIMENTS

Figure 1:
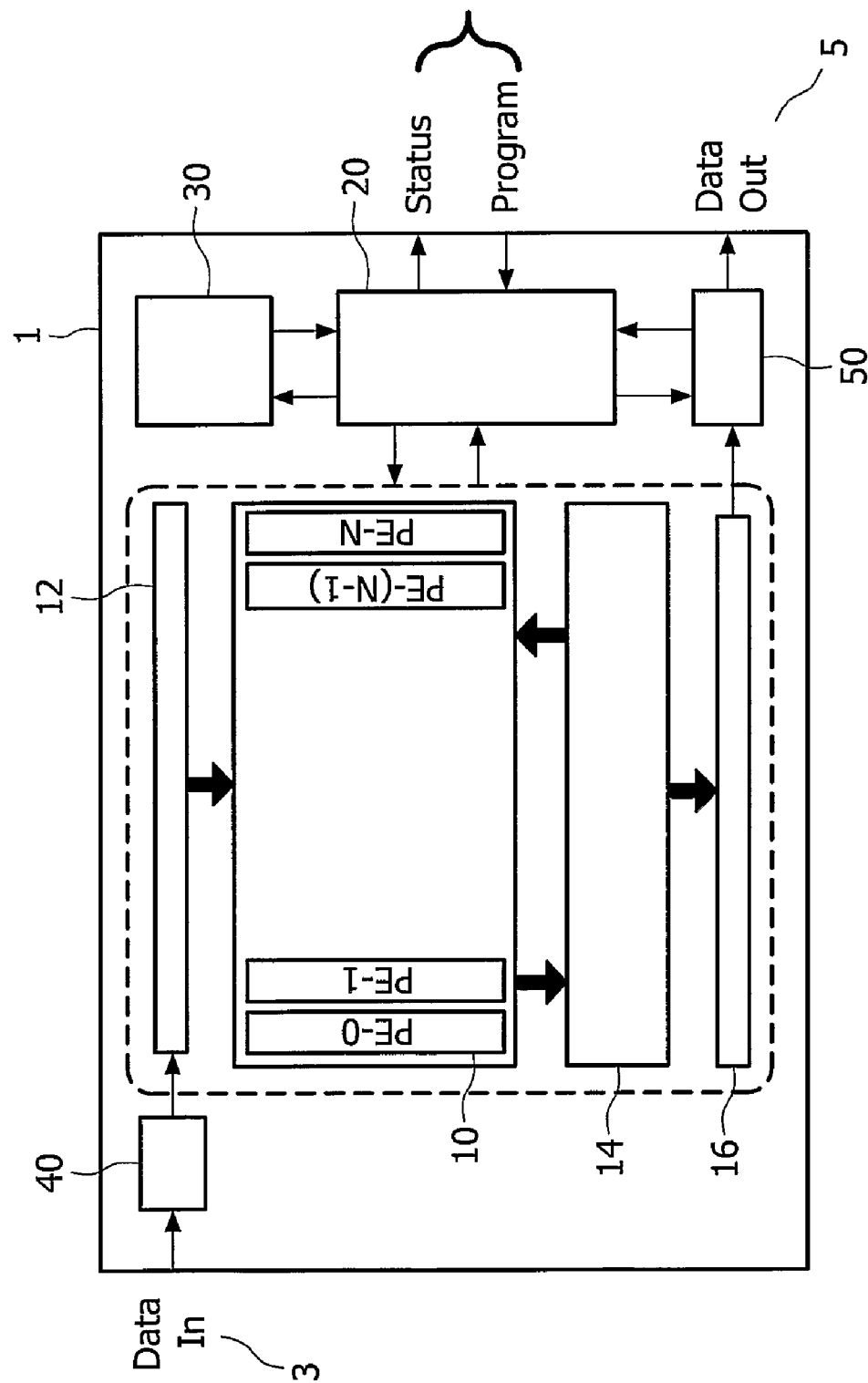
FIG. 1 is a block diagram illustrating an SIMD processing architecture.
Figure 2:
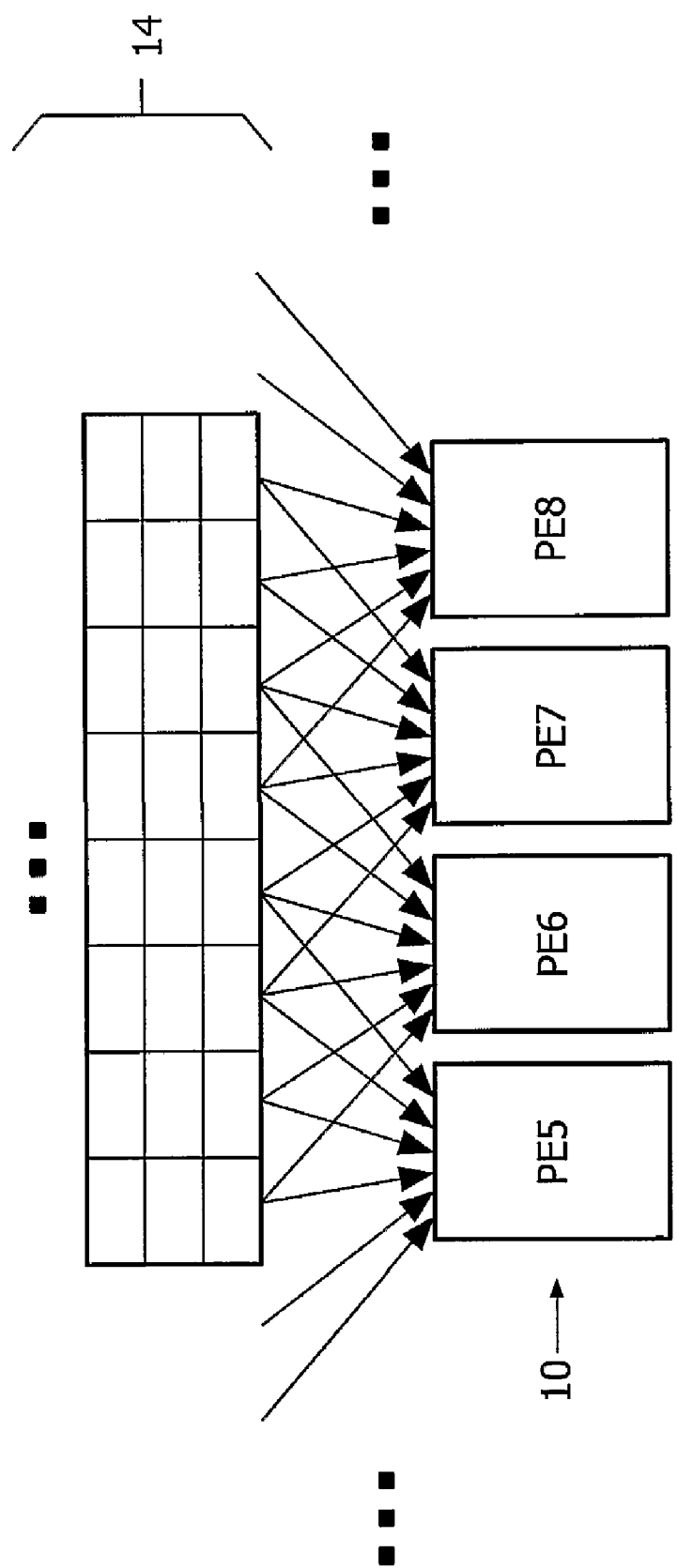
FIG. 2 is a block diagram illustrating memory transfer parts within the architecture of FIG. 1.

Embodiments of the present invention can provide SIMD architectures and techniques which can alleviate the drawbacks of prior considered architectures and techniques. In particular, embodiments of the present invention are concerned with enabling PE to PE inter-communication of data via the working line memory array 14. The embodiments of the present invention will be described with reference to FIG. 1, and also with reference to video processing, in which processing elements are used to generate colour and other video values for pixels on a display device. It will be readily appreciated that the processing techniques described in this disclosure can be applied to data other than video data.

There are reasons for limiting the number of PEs to be smaller than the number of pixels per line, for example for the sake of silicon efficiency, or when the input data entity is 2×2 pixels or larger. A similar situation can also arise in applications for which the computational demand can be met be fewer PEs than that of a fully-parallel SIMD architecture.

Figure 3:
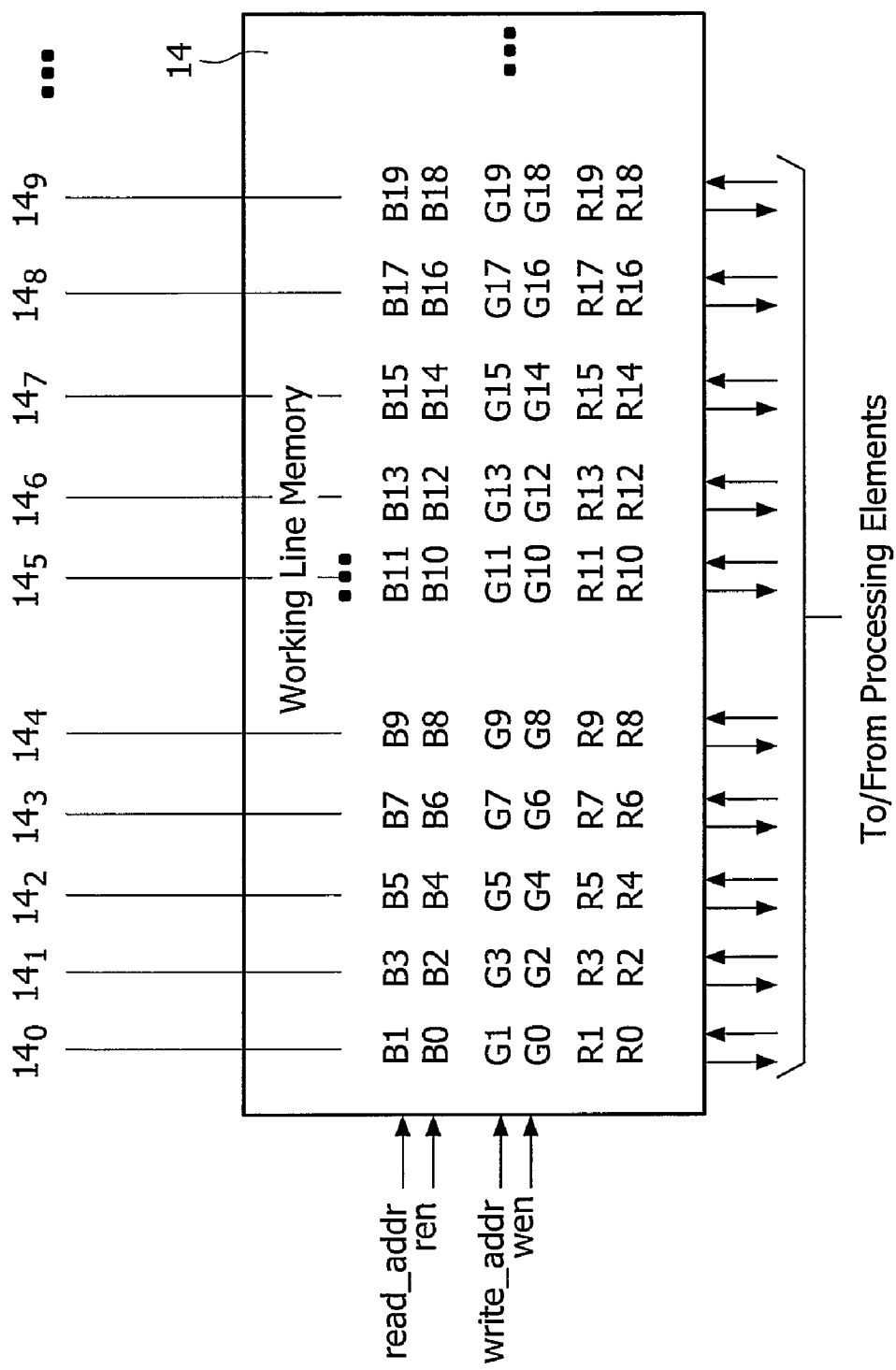
FIGS. 3 and 4 illustrate an interleaving technique embodying one aspect of the present invention.
Figure 4:
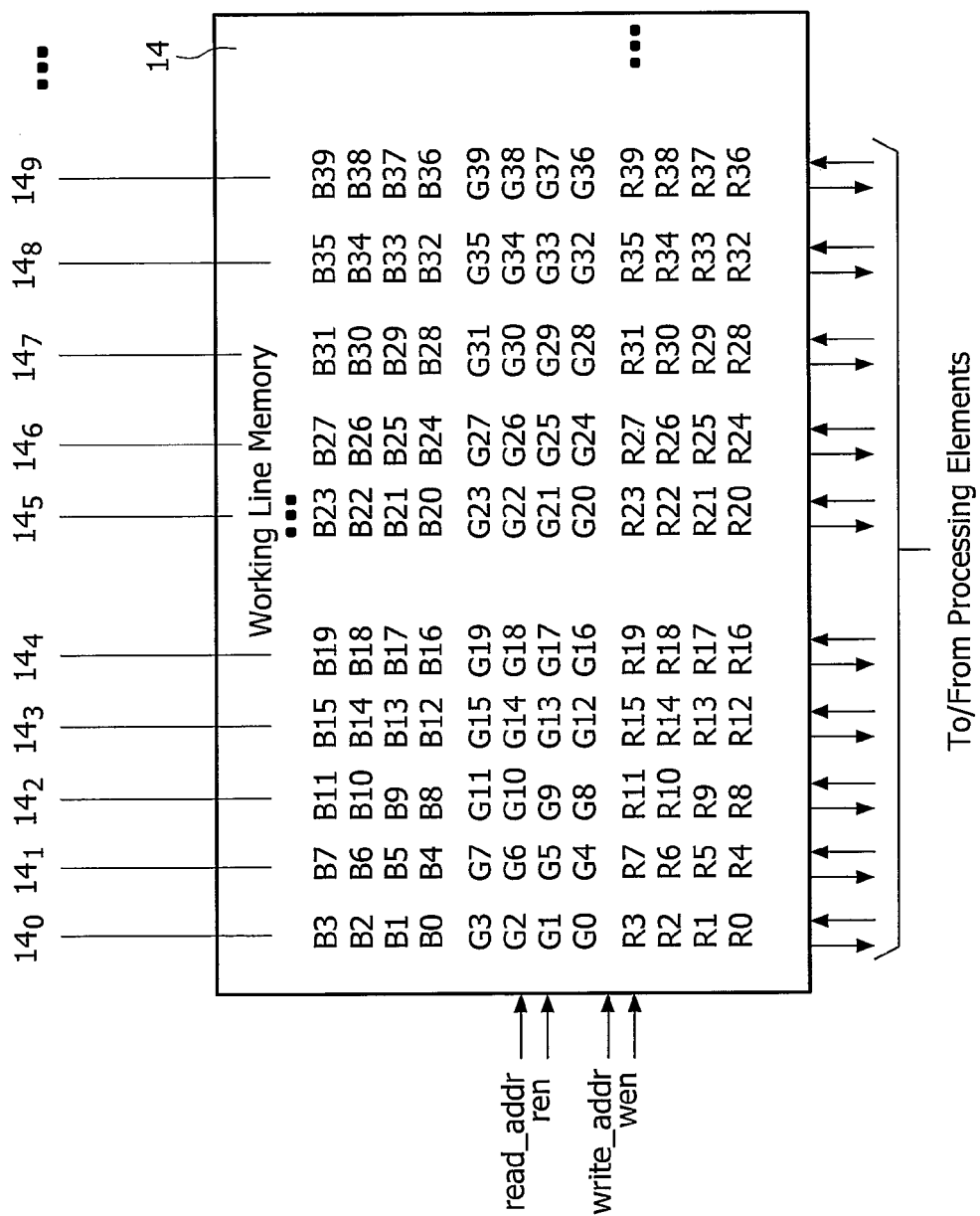

Embodiments of the present invention make use of a memory-interleaving technique that can reduce the N-to-1 switch and associated interconnect complexity to a simple 3-to-1 switch. Such a 3-to-1 switch can be implemented using a staggered layout technique such as that disclosed in WO2002/093905. FIGS. 3 and 4 show an interleaved pixel storage technique embodying the present invention, for the cases when the number of PEs is half and a quarter of the number of pixels per line, respectively. The interface to the array of PEs is shown by the input and output data lines. In both pictures, the colours (Red(R), Green(G) and Blue(B)) are complete image lines, the pixels of which have been appropriately placed in columns partitioned over the number of PEs.

To enable PE to PE neighbour communication, the working line-memory array 14 uses an existing addressing mechanism, without the need for any external interconnection cost. As can be seen from FIG. 3, the simplest case when the number of processing elements is half the number of pixels, it can be seen that the memory array portion $14_0 \ldots 14_9$ are assigned two groups of three pixel values. Each pixel has a red green and blue value (indicated by R, G and B). In FIG. 3 the pixel number is indicated in the memory array. Thus, the values for pixel 0 are given by R0, G0 and B0, and the values for pixel 1 are given by R1, G1 and B1 etc. The pixel values for pixels 0 and 1 are assigned to the first memory array portion $14_0$. Similarly, the remaining working line memory array portions are assigned respective pairs of pixel values.

FIG. 4 illustrates the case when the number of processing elements is one quarter of the number of pixels to be displayed. Accordingly, each working line memory array portion $14_0 \ldots 14_9$ is assigned red, green and blue values for each of four pixels. FIG. 4 illustrates the manner in which this can be achieved.

For a first processing element to be able to access data stored in a memory portion assigned to a neighbouring (second) processing element, the memory access is achieved using an index value which is indicative of the memory portion, relative to the memory portion assigned to the first processing element, from which data is to be retrieved.

FIG. 5 illustrates how the PE-to-PE communication is realized within the working memory array 14 by appropriate indexing. A simple PE task, copying a memory location to the PE accumulator is used as an example. In the case of two-pixel interleaving, shown in (a), indices (0,1) are used to access pixels allocated to a PE while (−2,−1) and (2,3) are used to access pixels allocated for the left and right PEs respectively. The same approach can be extended to higher interleaving degrees as shown for the four-pixel interleaving in (b).

Figure 6:
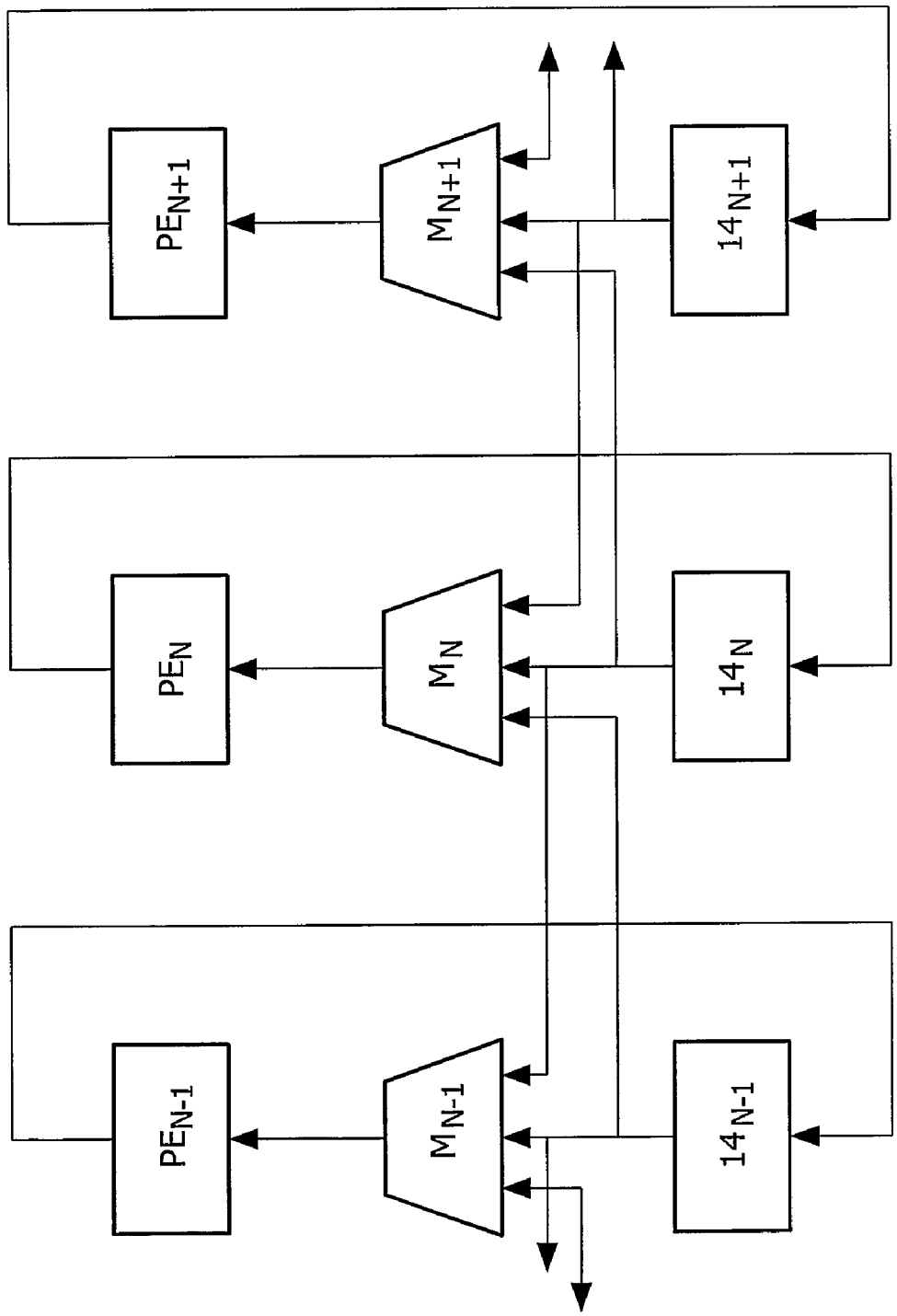
FIG. 6 illustrates an implementation of the techniques of FIGS. 3 to 5.

FIG. 6 illustrates one possible implementation of the techniques described in FIGS. 3, 4 and 5. Each PE ($PE_{N-1}$, $PE_N$, and $PE_{N+1}$) has an associated multiplexer $M_{N-1}$, $M_N$ and $M_{N+1}$. The multiplexers are connected to receive data from the memory array portion assigned to the processing element concerned, and also to receive data from neighbouring (left and right) processing element memory array portions. In FIG. 6, it can be seen that $PE_N$ is able to receive data from its own memory portion $14_N$ and from the memory portions $14_{N-1}$ and $14_{N+1}$ assigned to the left PE ($PE_{N-1}$) and the right PE ($PE_{N+1}$) respectively. Using the values shown in FIG. 5, the correct data path can therefore be selected through the respective multiplexers. In FIG. 5, the column labelled PE Task shows example accumulator values, and the columns labelled Effect @$PE_{10}$ and Effect @$PE_{14}$ show the pixel value that is retrieved at processing elements 10 and 14 respectively. The PE Mux Select column shows how the PE multiplexer is to be controlled.

This memory interleaving approach proves attractive when the number of PEs is smaller than the number of data elements per line by an integral factor. However, if there are as many PEs as data elements per line (as is the case with fully-parallel SIMD architectures), no interleaving can be done and consequently there is no benefit with regard to inter-PE communication. The same techniques could be used successfully with different specific index values, for example (−1, 0, 1). The techniques are not limited to particular video values.

Fortunately, the more the PEs in the SIMD architecture the slower the clocking speed as the algorithmic load remains the same. This lower speed can be exploited to realize a time-distributed communication interface to provide the necessary PE-to-PE communication. The basic idea is to use an N-shifter to align data elements to the appropriate PEs by doing N left/right shifts within one system cycle. The maximum allowable number of shifts ($N_{max}$) depends on the time needed per shift ($t_{shift}$), the period of the system clock ($T_{syst}$) and the time taken by a PE to perform a load operation ($t_{load}$).

$$N \max = \lfloor T\text{syst} - t\text{load}/t\text{shift} \rfloor \qquad (1)$$

Figure 7:
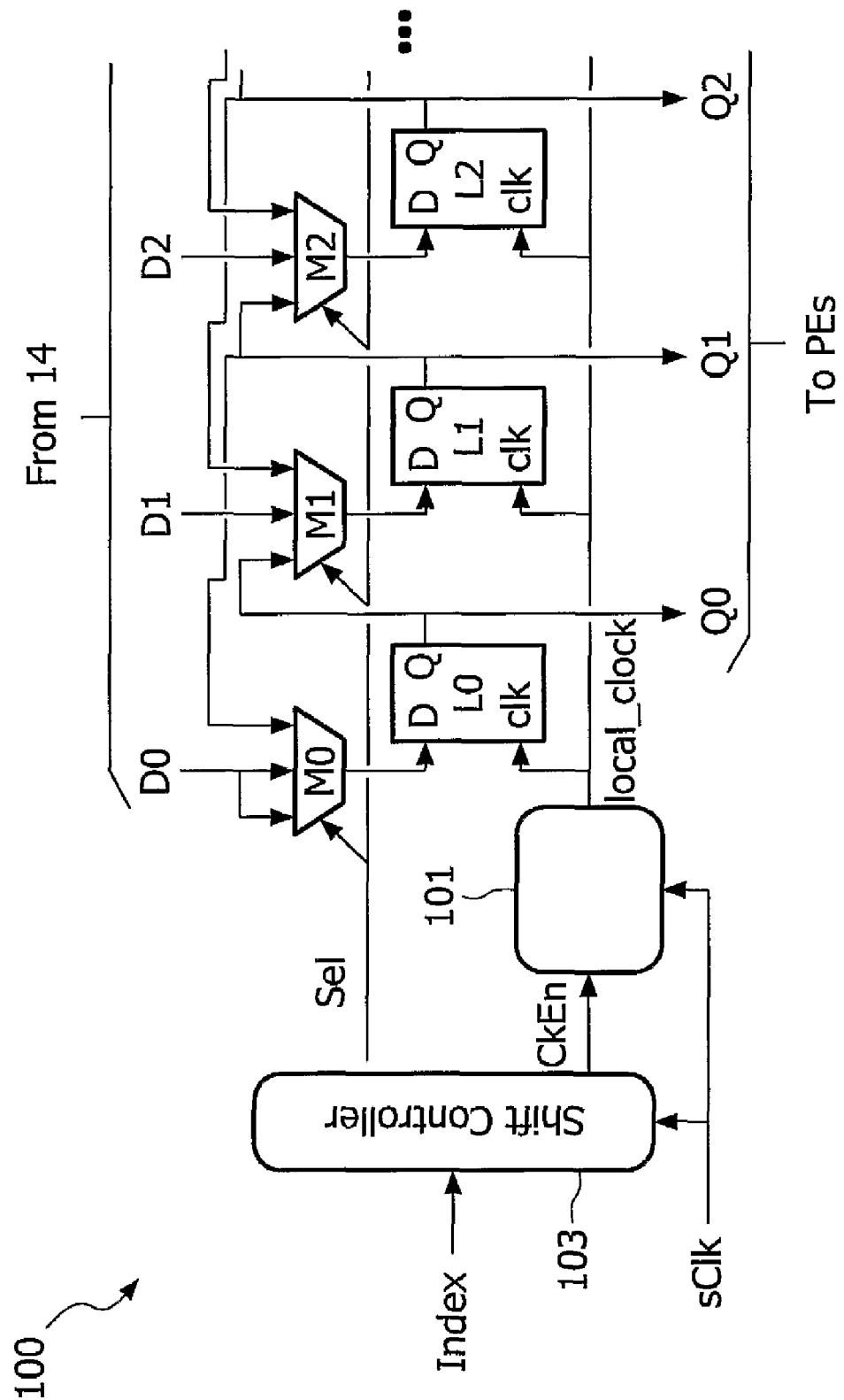
FIG. 7 illustrates another technique embodying the present invention.

A possible implementation of this approach is shown in FIG. 7. The implementation includes, for each processing element and memory array portion, a multiplexer M and a register R. As shown in FIG. 7, PE1 has an associated multiplexer M1, and register R1. A shift controller 103 is provided which controls the multiplexers and a clocking signal to the register. This clocking signal (local_clock) is provided by a clock unit 101. The memory portion output is connected to the multiplexer associated with that memory portion, and to the neighbouring multiplexers. Thus, for memory portion 1 (PE1) the data output from the memory portion D1 is connected to multiplexer M1. The output of the multiplexer is connected to the appropriate register R1. When the clock signal CLK is enabled, the input to the register R1 is output to the PE1 from the output Q1. The registers operate in conventional fashion. Each register output is also fed to the neighbouring multiplexers, such that multiplexer M1, for PE1, receives inputs from memory portion 1 (D1) and the outputs of registers R0 and R2. The operation of the FIG. 7 data transfer unit is as follows, the data at the base address is loaded onto the registers during the first local clock cycle. Following this, N local clock pulses are generated to perform N-shifts. The shift direction and the number of shifts are prepared by the controller. Following this, the controller then determines the correct operation by enabling/disabling the clock generator. The period of the local clock is set to allow proper stage functioning.

In cases where the number of PEs is smaller than the number of data elements per line, the shifter and memory interleaving techniques can be combined to maximize the access range of the PEs.

The shifter based approach confines the speed-up region to a small portion of the IC thereby saving power dissipation which would otherwise be needed to realize the same functionality by speeding up all the PEs and the global interconnect to execute a number of shift-copy operations to align the data elements.

The shifter-based approach in principle moves the input data selection muxes from the PEs to the memory interface module.

Accordingly, embodiments of the present invention are able to provide methodologies and techniques which enable cost effective and practical PE to PE, and PE to memory, communications to be achieved.

The invention claimed is:

1. A single instruction multiple data processor comprising:
a processing element array including a plurality of processing elements; and
a memory array operably divided into memory portions, each of the memory portions being assigned to a particular one of the processing elements, the processing elements configured to transfer data to and from the memory array, characterised in that a first one of the processing elements is operable to access a portion of the memory array assigned to the first processing element and to access a portion of the memory array assigned to a second one of the processing elements, such access being made using an index value indicative of the processing element assigned to the memory position to be accessed.

2. A processor as claimed in claim 1, wherein the index value is indicative of the processing element and an address in the portion of the memory array concerned.

3. A processor as claimed in claim 1, wherein the index value is indicative of the position of the second processing element relative to the first processing element.

4. A processor as claimed in claim 1, further comprising, for each of the processing elements, a multiplexer that is configured to select a data path for transferring data from the memory array to the associated processing element, the multiplexer connected to receive data from the portion of the memory array assigned to the associated processing element and to receive data from the portions of the memory array assigned to the two processing elements neighboring the associated processing element.

5. A processor as claimed in claim 1, further comprising:
a data transfer unit having a controller and a clock signal generator; and
for each of the processing elements, a multiplexer and register, the register connected to supply data items to the associated processing element and to receive data items from the associated multiplexer, wherein the multiplexer is operable to select one of a plurality of data inputs in dependence upon the index value, the plurality of data inputs including data from the portion of the memory array assigned to the associated processing element and data from the portions of the memory array assigned to the two processing elements neighboring the associated processing element.

6. A method for communicating data between processing elements in an SIMD array of processing elements each of which is operable to access data stored in a memory array and to transfer data to the memory array, the method comprising:
assigning a respective portion of the memory array to each of the processing elements in the array;
transferring data from the processing elements to the assigned portions of the memory array;
for a first processing element in the array, accessing the respective portions of the memory array assigned to the first processing element and assigned to a second processing element in the array using an index value indicative of the processing element to which the memory array portion is assigned.

7. A method as claimed in claim 6, wherein data for supply to the processing element concerned is selected using a multiplexer.

8. The processor of claim 1, further comprising an input line memory configured to provide serial-to-parallel conversion of incoming data and to transfer the converted incoming data to the processing elements of the array.

9. The processor of claim 8, further comprising an output line memory configured to receive outgoing data from the memory array and to provide parallel-to-serial conversion of the outgoing data, and a serial processor configured to receive the converted outgoing data from the output line memory, wherein in the memory array is a working memory that is configured to implement communication between the processing elements of the array.

10. The processor of claim 8, further comprising:
for each of the processing elements,
a multiplexer having a control input, having inputs connected to an output of the memory portion assigned to the associated processing element and to outputs of the memory portions assigned to two other ones of the processing elements, and having an output, and
a register having a clock input, having an input connected to the output of the multiplexer, and having an output connected to an input of the associated processing element;
a clock signal generator configured to provide a clock signal to the clock inputs of the registers; and
a shift controller configured to provide respective control signals to the control inputs of the multiplexers and to provide an enable signal to the clock signal generator.

11. The processor of claim 8, wherein each of the processing elements is configured to transfer data to only its associated portion of the memory array.

12. The processor of claim 8, wherein each of the portions of the memory array is assigned exclusively to only one of the processing elements.

* * * * *